United States Patent [19]
Yagi

[11] Patent Number: 5,995,168
[45] Date of Patent: Nov. 30, 1999

[54] DIGITAL VIDEO RECEIVER

[75] Inventor: Manabu Yagi, Tokyo, Japan

[73] Assignee: NEC Corporation, Tokyo, Japan

[21] Appl. No.: 08/790,801

[22] Filed: Jan. 30, 1997

[30] Foreign Application Priority Data

Jan. 31, 1996 [JP] Japan .................................. 8-037577

[51] Int. Cl.[6] .............................. H04N 5/44; H04N 5/455
[52] U.S. Cl. ........................ 348/725; 348/726; 348/507; 348/508; 348/720; 375/326; 375/261
[58] Field of Search ................................... 348/720, 725, 348/726, 558, 426, 461, 731, 554, 507, 508; 375/326, 327, 340, 341, 344, 346, 320, 261, 262, 229; H04N 5/44, 5/455, 5/45, 5/445

[56] References Cited

U.S. PATENT DOCUMENTS

| | | | |
|---|---|---|---|
| 4,546,322 | 10/1985 | Crutcher ..................................... | 329/50 |
| 5,113,142 | 5/1992 | Yoshikawa .............................. | 329/306 |
| 5,487,186 | 1/1996 | Scarpa ..................................... | 375/344 |
| 5,495,203 | 2/1996 | Harp et al. .............................. | 375/261 |
| 5,506,636 | 4/1996 | Patel et al. .............................. | 348/725 |
| 5,570,136 | 10/1996 | Kim ........................................ | 348/725 |
| 5,608,764 | 3/1997 | Sugita et al. ............................. | 375/344 |
| 5,629,962 | 5/1997 | Okumura et al. ...................... | 375/327 |
| 5,636,250 | 6/1997 | Scarpa ..................................... | 348/725 |
| 5,671,253 | 9/1997 | Stewart .................................... | 375/326 |
| 5,673,293 | 9/1997 | Scarpa et al. ........................... | 375/321 |
| 5,694,389 | 12/1997 | Seki et al. ............................... | 375/326 |
| 5,694,419 | 12/1997 | Lawrence et al. ...................... | 375/222 |
| 5,715,012 | 2/1998 | Patel et al. .............................. | 348/558 |
| 5,729,173 | 3/1998 | Sato ........................................ | 375/327 |
| 5,799,037 | 8/1998 | Strolle et al. ............................ | 375/326 |
| 5,805,242 | 9/1998 | Strolle et al. ............................ | 348/720 |
| 5,825,242 | 10/1998 | Prodan et al. ........................... | 348/726 |

FOREIGN PATENT DOCUMENTS 2185366  7/1987  United Kingdom .................. 375/326

Primary Examiner—Michael H. Lee
Assistant Examiner—Jean W. Désir
Attorney, Agent, or Firm—Young & Thompson

[57] ABSTRACT

A video receiver includes a tuner, a QAM demodulator including a selective gated PLL carrier recovery circuit, and a digital equalizer. The selective gated PLL carrier recovery circuit has a normal operation mode and a selection control mode. The channel changing of the tuner is performed after the selective gated PLL carrier recovery circuit is set to the selection control mode and the digital equalizer is held at its current state.

19 Claims, 5 Drawing Sheets

| ANALOG INPUT LEVEL OF $B_I/B_Q$ | | DIGITAL OUTPUT | | |
|---|---|---|---|---|
| | | c1, d1 | c2, d2 | c3, d3 |
| I1/Q1 | I1A/Q1A | 1 | 1 | 1 |
| | I1B/Q1B | | | 0 |
| I2/Q2 | I2A/Q2A | 1 | 0 | 1 |
| | I2B/Q2B | | | 0 |
| I3/Q3 | I3A/Q3A | 0 | 1 | 1 |
| | I3B/Q3B | | | 0 |
| I4/Q4 | I4A/Q4A | 0 | 0 | 1 |
| | I4B/Q4B | | | 0 |

DIGITAL VIDEO RECEIVER

BACKGROUND OF THE INVENTION

1. Field of the Invention

The present invention relates to a digital video system, and more particularly to a video receiving system that selects a desired channel from a plurality of channels and reproduces a digital video signal from a digital modulation signal of the selected channel.

2. Description of the Related Art

In an interactive television system (ITV) providing interactive services such as video-on-demand (which will be referred to as VOD hereinbelow), there has been recently developed a system in which a compressed video signal that is modulated according to a quadrature amplitude modulation scheme or the like is transmitted to a set-top box (STB) or a digital video selective-reproduction apparatus where the original video signal is demodulated and reproduced. In such a digital transmission system, a digital transversal equalizer employing a transversal filter is used in order to equalize amplitude delay distortion occurring in a transmission path, an up-converter, a tuner and others.

In such a set-top box, a tuner selects a desired carrier from a frequency-multiplexed input signal, and a digital modulation signal of the selected channel is demodulated by a QAM (or QPSK) demodulator. After being subjected to waveform equalization by the digital equalizer and to error correction, the demodulated signal is reproduced into a video signal by a digital signal processor which is output to a monitor. In general, channel selection of the tuner is performed by a user operating a remote control transmitter or an external switch so that the tuner receives a channel selection signal.

The digital modulation signals are usually frequency-multiplexed in several tens of frequency channels in steps of 6 MHz or 12 MHz, and the user performs a channel changing operation to select any desired channel among these channels. When changing the channel, however, a receiving frequency of the tuner is changed, resulting in a temporary input interrupt of the QAM demodulator. Control of the digital equalizer and a carrier recovery circuit of the QAM demodulator thus enters a divergent state, thereby requiring a relatively long time from input of a new channel signal to control convergence. Therefore the conventional receiver cannot achieve rapid channel changing.

SUMMARY OF THE INVENTION

It is an object of the present invention to provide a video receiver which shortens the time required for channel changing after a user designates a new channel from a plurality of available channels.

It is another object of the present invention to provide a control method which controls a demodulator and a digital equalizer in a video receiver so as to rapidly change channels.

According to the present invention, the channel changing is performed after a QAM demodulator including a selective gated carrier recovery circuit is set to a selection control mode and the digital equalizer is held at its current state. This prevents divergence of the selective gated carrier recovery circuit and the digital equalizer. Therefore, when the channel is changed, the control of the QAM demodulator and the digital equalizer rapidly converges.

A video receiver according to an aspect of the present invention is comprised of a receiver for receiving a modulation signal through a user-designated channel selected from a plurality of channels which are multiplexed in frequency division multiplexing (FDM). The modulation signal conveys a digital video signal according to $2^N$ (N is an even integer) quadrature amplitude modulation ($2^N$-QAM). The digital video signal is detected from the modulation signal by a QAM detector using a reproduced carrier signal which is reproduced by a carrier recovery circuit.

The carrier recovery circuit generates the reproduced carrier signal from the digital video signal received through the channel in a selected one of a first operation mode and a second operation mode. The first operation mode provides the reproduced carrier signal based on $2^N$ level ranges corresponding to possible signal points on a $2^N$-QAM signal constellation, respectively. On the other hand, the second operation mode provides the reproduced carrier signal based on selected level ranges corresponding to signal points selected from the possible signal points on the $2^N$-QAM signal constellation, respectively. More specifically, the second operation mode provides the reproduced carrier signal based on the selected level ranges corresponding to signal points existing on diagonal lines with respect to orthogonal axes of the $2^N$-QAM signal constellation.

The digital video signal obtained by the QAM detector using the reproduced carrier signal includes channel distortions caused by the channel. A digital equalizer compensates for the channel distortions included in the digital video signal to produce an equalized digital video signal.

A controller controls the carrier recovery circuit and the digital equalizer such that the second operation mode of the carrier recovery circuit is selected and the digital equalizer is held at a current state before changing the channel of the receiver.

The carrier recovery circuit is preferably comprised of a selective gated PLL circuit. The selective gated PLL circuit is comprised of an extracting circuit for extracting a PLL control signal from the digital video signal; a phase detection circuit for detecting the selected level ranges from the digital video signal to producing a detection signal; a phase control logic for generating a phase control signal from the PLL control signal according to control of the control means such that the phase control signal is generated based on the PLL control signal in the first operation mode selected and that the phase control signal is generated based on the PLL control signal and the detection signal in the second operation mode selected; and an oscillator for generating the reproduced carrier signal based on the phase control signal.

The digital equalizer is comprised of a transversal filter for compensating for the channel distortions by adjusting a plurality of tap coefficients thereof based on the digital video signal, wherein the tap coefficients is fixed to current values according to control of the control means.

Further preferably, the selective gated PLL circuit has a sync detection circuit which detects synchronization of the PLL circuit based on the phase control signal. When the PLL circuit operates in the second operation mode or when the synchronization of the PLL circuit is not detected, the PLL circuit generates the phase control signal based on the PLL control signal and the detection signal and the tap coefficients of the digital equalizer are fixed. When the PLL circuit operates in the first operation mode and the synchronization of the PLL circuit is detected, the PLL circuit generates the phase control signal based on only the PLL control signal and the tap coefficients of the digital equalizer are released.

DETAILED DESCRIPTION OF SPECIFIC EMBODIMENT

Figure 1:
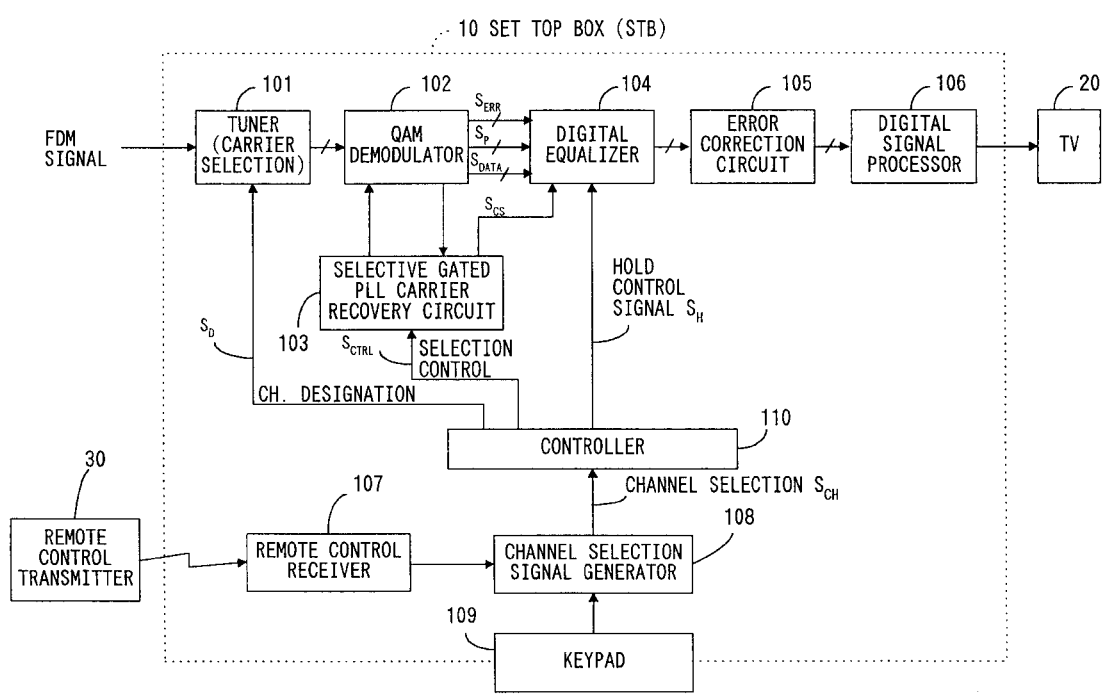
FIG. 1 is a block diagram showing a preferred embodiment of a digital video receiving system according to the present invention.

Referring to FIG. 1, a digital video receiving system includes a set top box (STB) 10, a television monitor 20, and a remote control transmitter 30. The set top box 10 is a receiver which selectively receives a plurality of channel signals which are produced using a frequency division multiplexing (FDM) scheme and include AM or FM modulation signals and 16QAM modulation signals for the respective channels. A desired channel is selected and thereby identified by a user operating the remote control transmitter 30 and the video signal of the selected channel is reproduced on the television monitor 20.

The set top box 10 is provided with a tuner 101 which is capable of selecting a desired channel (or carrier) as identified by the user from the received FDM signal in accordance with a channel designation signal $S_D$ as described later. The 16QAM modulation signal of the selected channel is output to a QAM demodulator 102 having a selective-gated PLL carrier recovery circuit 103. The QAM demodulator 102 and the selective-gated PLL carrier recovery circuit 103 demodulates the 16QAM modulation signal into a digital video signal $S_{DATA}$, an error signal $S_{ERR}$, and a polarity signal $S_P$. The selective-gated PLL carrier recovery circuit 103 changes its operation mode between a normal mode and a selective control mode in accordance with a selective control signal $S_{CTRL}$ as will be described later.

When receiving the digital video signal $S_{DATA}$, the error signal $S_{ERR}$, and the polarity signal $S_P$ from the QAM demodulator 102, a digital equalizer 104 performs adaptive equalization of amplitude delay distortions occurring in a transmission path, an up-converter and others including the tuner as described above. The digital equalizer 104 is formed with a transversal filter and its tap coefficients are adjusted in response to the error signal $S_{ERR}$ and the polarity signal $S_P$. As will be described later, the equalization operation of the digital equalizer 104 is stopped and its current state is frozen by a hold control signal $S_H$. The equalized signal by the digital equalizer 104 is subjected to error correction by an error correction circuit 105 and then expanded and converted into a video signal by a digital signal processor 106. The video signal is output to the television monitor 20 and the video image is reproduced on screen.

Channel or carrier selection of the tuner 101 is made by the user usually operating the remote control transmitter 30. More specifically, a remote control receiver 107 receives an infrared signal carrying channel information from the remote control transmitter 30. When receiving the channel information, a channel selection signal generator 108 generates a channel selection signal $S_{CH}$ and outputs it to a controller 110. It is to be noted that the channel selection is similarly ensured by an external keypad 109 provided in the STB 10.

When receiving the channel selection signal $S_{CH}$ from the channel selection signal generator 108, the controller 110 first outputs a selection control signal $S_{CTRL}$ and the hold control signal $S_H$ to the selective gated PLL carrier recovery circuit 103 and the digital equalizer 104, respectively. The selection control signal $S_{CTRL}$ causes the selective gated PLL carrier recovery circuit 103 to change the operation mode to the selection control mode. The hold control signal $S_H$ causes the digital equalizer 104 to enter the hold state where the tap coefficients thereof are fixed to its current values.

After the selection control signal $S_{CTRL}$ and the hold control signal $S_H$ have been output, the channel designation signal $S_D$ is output to the tuner 101 so as to change the current channel to a new one. When the channel changing of the tuner 101 and the carrier synchronization of the selective gated PLL carrier recovery circuit 103 are completed, the selective gated PLL carrier recovery circuit 103 returns to the normal carrier recovery operation and, at the same time, the digital equalizer 104 also returns to the normal equalization mode where the tap coefficients are adjusted according to the error signal $S_{ERR}$ and the polarity signal $S_P$ received from the QAM demodulator 102.

In this manner, the controller 110 controls the respective operation modes of the selective gated PLL carrier recovery circuit 103 and the digital equalizer 104 such that the selective gated PLL carrier recovery circuit 103 is set to the selection control mode and the digital equalizer 104 is held to the current state of the tap coefficients just before the tuner 101 actually changes the channel.

16QAM CARRIER RECOVERY

Figure 2:
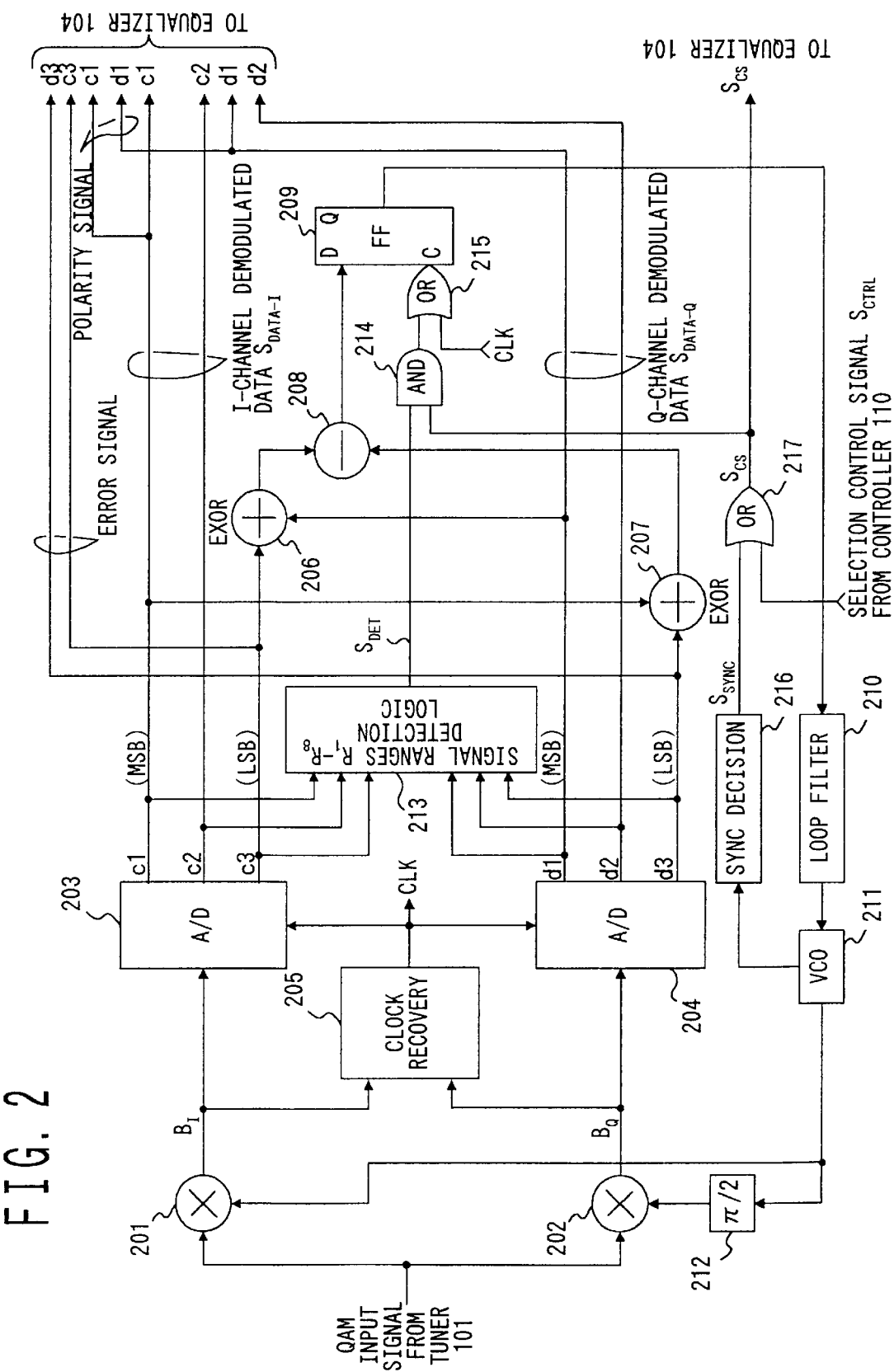
FIG. 2 is a detailed block diagram showing a 16QAM demodulator having a selective gated PLL carrier recovery circuit according to the embodiment.

Referring to FIG. 2, there is shown a detailed circuit configuration of the QAM demodulator 102 having the selective-gated PLL carrier recovery circuit 103 which is disclosed in Japanese Patent Unexamined Publication No. 4-165737.

The QAM demodulator is provided with two multipliers 201 and 202 which receive the QAM modulation signal of a selected channel from the tuner 101 and perform coherent detection using orthogonal oscillation signals. The respective multipliers 201 and 202 output baseband signals $B_I$ and $B_Q$ to analog-to-digital (A/D) converters 203 and 204 as well as a clock recovery circuit 205. The respective A/D converters 203 and 204 convert the baseband signals $B_I$ and $B_Q$ into three-bit digital data in accordance with a clock signal CLK. More specifically, the first A/D converter 203 converts the baseband signal $B_I$ into three-bit digital data of I channel (c1, c2, c3). Similarly, the second A/D converter 204 converts the baseband signal $B_Q$ into three-bit digital data of Q channel (d1, d2, d3).

The upper 2-bit data (c1, c2) of the I channel is output as I-channel demodulated data $S_{DATA-I}$ to the digital equalizer 104 and the upper 2-bit data (d1, d2) of the Q channel is output as Q-channel demodulated data $S_{DATA-Q}$ to the digital equalizer 104. The most significant bits c1 and d1 are output as the polarity signal $S_P$ to the digital equalizer 104, and the least significant bits c3 and d3 are output as the error signal $S_{ERR}$ to the digital equalizer 104, which will be described in detail.

The least significant bit c3 and the most significant bit d1 are EXCLUSIVE-ORed by the exclusive-OR gate 206 and similarly the least significant bit d3 and the most significant bit c1 are EXCLUSIVE-ORed by the exclusive-OR gate 207. The difference between the output data of the exclusive-OR gates 206 and 207 is produced by a subtracter 208 and then is output as a phase control signal to the flip-flop circuit 209 which performs timing conversion according to a received clock. The phase control signal is output from the flip-flop circuit 209 to a loop filter 210 which removes noise components from the output of the flip-flop circuit 209 to produce a control signal. A voltage controlled oscillator (VCO) 211 receives the control signal and generates an oscillation signal depending on the control signal. The oscillation signal is directly supplied to the multiplier 201 and the $\pi/2$-shifted oscillation signal is supplied to the multiplier 202 through a $\pi/2$ phase shifter 212.

Figures 3A, 3B:
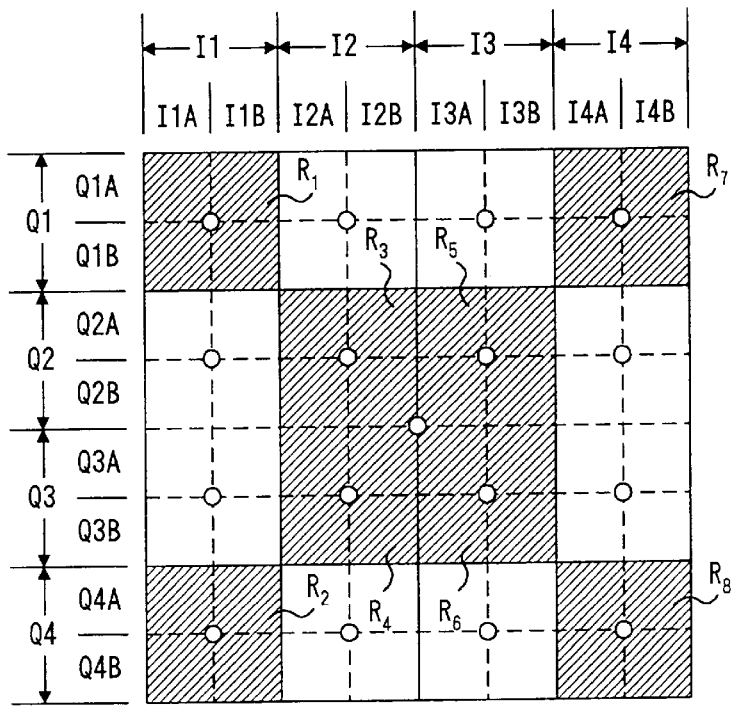
FIG. 3A is a diagram showing the 16QAM signal constellation for explaining an operation of the 16QAM demodulator and the selective gated PLL carrier recovery circuit in the embodiment.
FIG. 3B is a diagram showing the relationship between an analog input level and digital output data for explaining an operation of the 16QAM demodulator and the selective gated PLL carrier recovery circuit in the embodiment.

The three-bit digital data of I channel (c1, c2, c3) and the three-bit digital data of Q channel (d1, d2, d3) are output to a logic circuit 213 which detects only the signal ranges existing on diagonal lines of I-Q plane (see the shaded level ranges $R_1$–$R_8$ of FIG. 3A). When one of the signal ranges $R_1$–$R_8$ is detected, the logic circuit 213 outputs a detection signal $S_{DET}$ of a 1 to an AND gate 214. The AND gate 214 receives the detection signal $S_{DET}$ and a control signal $S_{CS}$, and the output of the AND gate 214 is output to an OR gate 215 which also receives the clock signal CLK from the clock recovery circuit 205. The output of the OR gate 215 is output as a clock signal to the flip-flop circuit 209.

A sync detection circuit 216 detects synchronization of the phase-locked loop by monitoring the frequency control voltage fed back to the VCO 211. In the case of synchronization, the sync detection circuit 216 outputs a sync detection signal $S_{SYNC}$ of a 0 and otherwise the sync detection signal $S_{SYNC}$ of a 1 to an OR gate 217. The OR gate 217 receives the sync detection signal $S_{SYNC}$ as well as the selection control signal $S_{CTRL}$ and produces the control signal $S_{CS}$ which is also output to the digital equalizer 104. It should be noted that the synchronization of the phase-locked loop may be also detected by monitoring the error rate of the demodulated data.

Since the control signal $S_{CS}$ is the OR of the sync detection signal $S_{SYNC}$ and the selection control signal $S_{CTRL}$, the detection signal $S_{DET}$ is transferred as a clock signal to the flip-flop circuit 209 through the AND gate 214 and the OR gate 215 when the selection control signal $S_{CTRL}$ becomes high. In other words, the selective gated PLL carrier recovery circuit is forced to enter the selection control mode by the controller 110 and then returns to the normal mode when both the sync detection signal $S_{SYNC}$ and the selection control signal $S_{CTRL}$ become low.

It should be noted that the above carrier recovery scheme can be applied to $2^N$-level QAM input signal where N is an even integer greater than 1.

SELECTION CONTROL MODE

As shown in FIG. 3A, the I-channel level range is divided into four level ranges I1–I4 each corresponding to an I-channel signal point and each of which is further divided into two error ranges InA and InB (n=1, 2, 3, or 4). Similarly, the Q-channel level range is divided into four level ranges Q1–Q4 each corresponding to a Q-channel signal point and each of which is further divided into two error ranges QnA and QnB.

Referring to FIG. 3B, the respective A/D converters 203 and 204 produce digital data (c1, c2, c3) and (d1, d2, d3) depending on the input levels of the analog baseband signals $B_I$ and $B_Q$. Therefore, the detection logic circuit 213 is capable of detecting only the signal level ranges $R_1$–$R_8$ corresponding to signal points existing on diagonal lines of the I-Q plane from the digital data (c1, c2, c3) and (d1, d2, d3). Since the detection signal $S_{DET}$ is transferred to the flip-flop circuit 209 through the AND gate 214 and the OR gate 215 when at least one of the selection control signal $S_{CTRL}$ and the sync detection signal $S_{SYNC}$ is high, the phase control signal is generated from only the signal level ranges $R_1$–$R_8$ and is supplied to the VCO 211. This prevents the reduction of carrier pull-in range of the PLL circuit. Thus, even though the channel is changed in the tuner 101 and the QAM demodulator 102 temporarily fails to input the QAM modulation signal, input of the subsequent normal signal enables the rapid carrier pull-in operation. After the normal signal is input and the carrier is synchronized, that is, the selection control signal $S_{CTRL}$ and the sync detection signal $S_{SYNC}$ are both low, the phase control signal is generated from all signal points as in the normal operation mode.

DIGITAL EQUALIZER

In this embodiment, the digital equalizer 104 includes four equalizers corresponding to the demodulated data bits c1, c2, d1, and d2, respectively. Each equalizer is comprised of a transversal filter as shown in FIG. 4.

Figure 4:
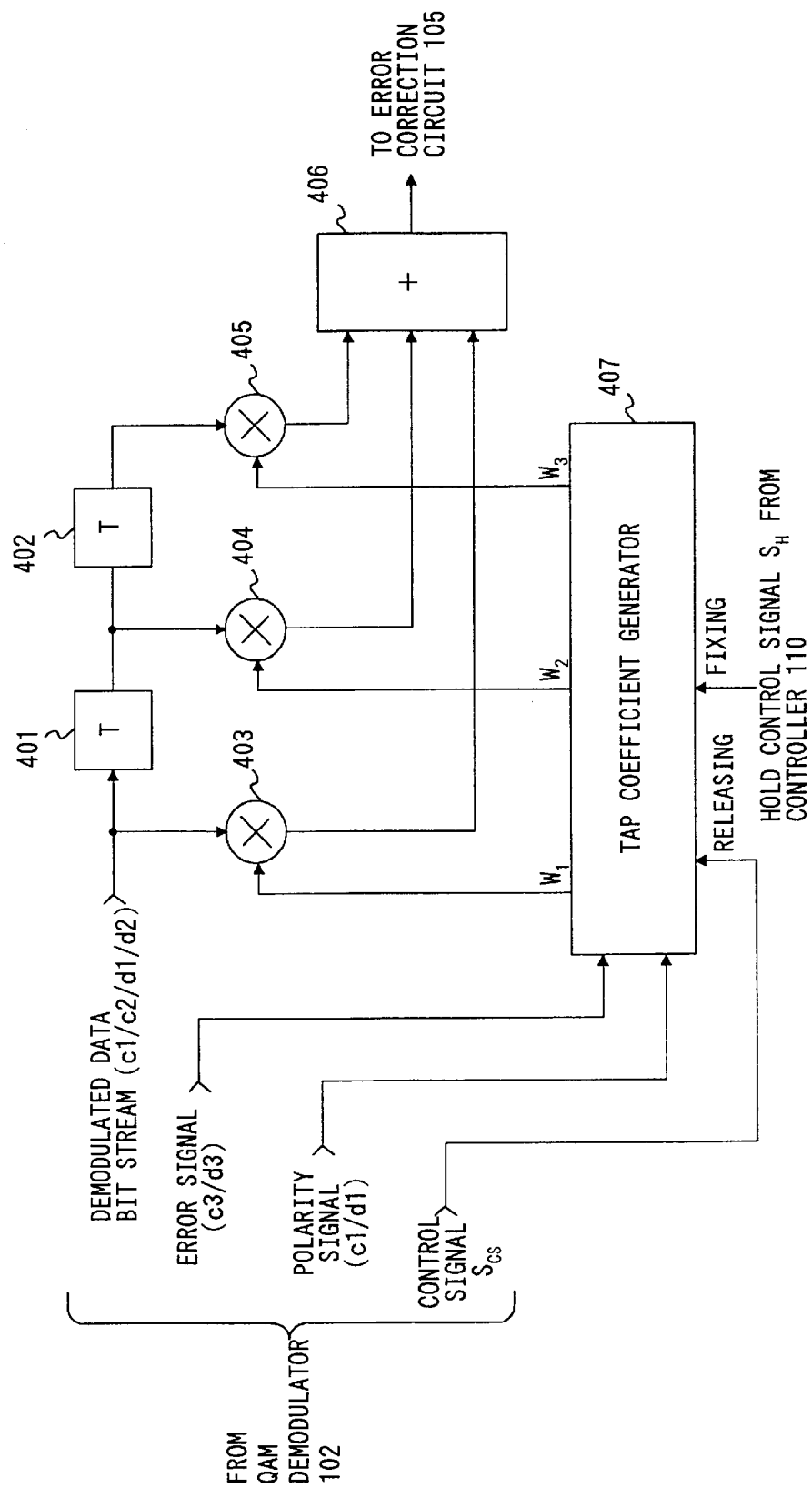
FIG. 4 is a block diagram showing an example of the configuration of a digital equalizer in the embodiment.

Referring to FIG. 4, the demodulated data bit stream received from the QAM demodulator 102 is passed through a tapped delay line with tap spacing T. For instance, the tapped delay line is comprised of delay circuits 401 and 402. The respective tapped bits are output to multipliers 403–405 which multiplies them by weighting factors or tap coefficients $W_1$–$W_3$ generated by a tap coefficient generator 407. The weighted bits are added by an adder 406 to form the equalized output signal which is output to the error correction circuit 105.

The tap coefficient generator 407 generates the tap coefficients $W_1$–$W_3$ for each bit depending on intersymbol interference which is determined based on the error signal $S_{ERR}$ and the polarity signal $S_P$ received from the QAM demodulator 102. Further, the tap coefficient generator 407 holds a set of tap coefficients at the time when the hold control signal $S_H$ is received from the controller 110. In other words, the respective tap coefficients $W_1$–$W_3$ are fixed to the values at that time. On the other hand, when the control signal $S_{CS}$ of a 0 is received from the QAM demodulator 102, the tap coefficient generator 407 returns to the normal equalization operation where the tap coefficients $W_1$–$W_3$ are adjusted depending on the error signal $S_{ERR}$ and the polarity signal $S_P$.

OPERATION

Figure 5:
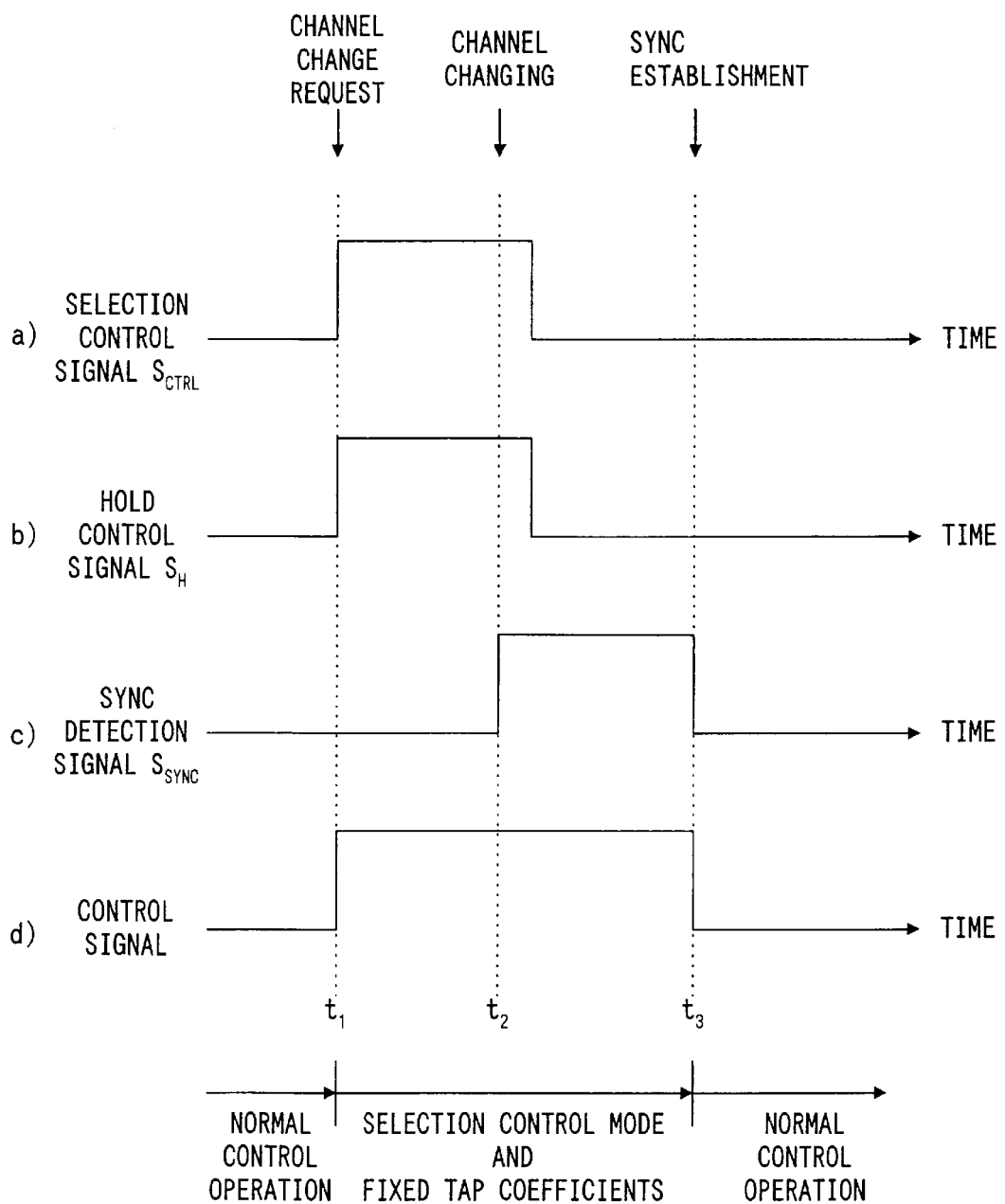
FIG. 5 is a timing chart showing a control operation of the system according to the embodiment.

Referring to FIG. 5, it is assumed that a channel change request occurs at time instant $t_1$ during normal control operation. When receiving the channel selection signal $S_{CH}$ from the channel selection signal generator 108, the controller 110 forces the selection control signal $S_{CTRL}$ to go high so as to set the selective gated PLL carrier recovery circuit 103 to the selection control mode. At the same time, the controller 110 forces the hold control signal $S_H$ to go high so as to fix the tap coefficients of the digital equalizer 104 to its current values. The selection control signal $S_{CTRL}$ is kept high until after the channel is actually changed.

After the selective gated PLL carrier recovery circuit 103 is set to the selection control mode and the tap coefficients of the digital equalizer 104 is fixed, the channel designation signal $S_D$ is output to the tuner 101 so as to actually change the channel to a new one. When the channel is changed at time instant $t_2$, the PLL circuit of the selective gated PLL carrier recovery circuit 103 is out of synchronization. Therefore, the sync detection signal $S_{SYNC}$ of the sync decision circuit 216 is kept high until the PLL circuit returns to its synchronization state.

As described before, the control signal $S_{CS}$ is the OR of the sync detection signal $S_{SYNC}$ and the selection control signal $S_{CTRL}$. Therefore, the control signal $S_{SC}$ is kept high and goes low at time instant $t_3$ when the PLL circuit returns to its synchronization state and the sync detection signal $S_{SYNC}$ goes low. In other words, the selection control mode of the QAM demodulator 102 and the fixed tap coefficients of the digital equalizer 104 are maintained during the period $t_1-t_3$.

When the carrier synchronization of the selective gated PLL carrier recovery circuit 103 is recovered again in the new channel at time instant $t_3$, the selective gated PLL carrier recovery circuit 103 returns to the normal carrier recovery operation and, at the same time, the digital equalizer 104 also returns to the normal equalization mode where the tap coefficients are adjusted according to the error signal $S_{ERR}$ and the polarity signal $S_P$ received from the QAM demodulator 102.

While the present invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A video receiver comprising:
   receiving means for receiving a modulation signal through a user-designated channel selected from a plurality of channels which are multiplexed in frequency division multiplexing, the modulation signal conveying a digital video signal according to $2^N$ (N is an even integer) quadrature amplitude modulation ($2^N$-QAM);
   detecting means for detecting the digital video signal from the modulation signal using a reproduced carrier signal;
   carrier generating means for generating the reproduced carrier signal from the digital video signal received through the user-designated channel, the carrier generating means having a first operation mode and a second operation mode which are selectable, the first operation mode providing the reproduced carrier signal based on $2^N$ level ranges corresponding to possible signal points on a $2^N$-QAM signal constellation, respectively, and the second operation mode providing the reproduced carrier signal based on selected level ranges corresponding to signal points selected from the possible signal points on the $2^N$-QAM signal constellation, respectively;
   equalization means for compensating for channel distortions included in the digital video signal to produce an equalized digital video signal; and
   control means for controlling such that the carrier generating means is set to the second operation mode and the equalization means is held at a current state before changing the channel of the receiving means from a presently received channel to a newly selected user-designated channel.

2. The video receiver according to claim 1, wherein the second operation mode provides the reproduced carrier signal based on the selected level ranges corresponding to signal points existing on diagonal lines with respect to orthogonal axes of the $2^N$-QAM signal constellation.

3. The video receiver according to claim 1, wherein the carrier generating means comprises a PLL (phase-locked loop) circuit,
   the PLL circuit comprising:
      an extracting circuit for extracting a PLL control signal from the digital video signal;
      a phase detection circuit for detecting the selected level ranges from the digital video signal to producing a detection signal;
      phase control means for generating a phase control signal from the PLL control signal according to control of the control means such that the phase control signal is generated based on the PLL control signal in the first operation mode selected and that the phase control signal is generated based on the PLL control signal and the detection signal in the second operation mode selected; and
      an oscillator for generating the reproduced carrier signal based on the phase control signal.

4. The video receiver according to claim 3, wherein the PLL circuit further comprises a sync detection circuit for detecting synchronization of the PLL circuit based on the phase control signal, wherein the phase control signal is generated based on the PLL control signal and the detection signal when the synchronization of the PLL circuit is not detected.

5. The video receiver according to claim 1, wherein the equalization means comprises a transversal filter for compensating for the channel distortions by adjusting a plurality of tap coefficients thereof based on the digital video signal, wherein the equalization means is held at the current state by fixing the tap coefficients to current values according to control of the control means.

6. The video receiver according to claim 5, wherein the tap coefficients are fixed to the current values when the carrier generating means is set to the second operation mode.

7. The video receiver according to claim 3, wherein the PLL circuit further comprises a sync detection circuit for detecting synchronization of the PLL circuit based on the phase control signal,
   wherein the PLL circuit generates the phase control signal based on the PLL control signal and the detection signal when operating in the second operation mode or out of synchronization, and
   the PLL circuit generates the phase control signal based on the PLL control signal when operating in the first operation mode and in synchronization.

8. The video receiver according to claim 7, wherein the equalization means comprises a transversal filter for compensating for the channel distortions by adjusting a plurality of tap coefficients thereof based on the digital video signal,
   wherein the equalization means is held at the current state by fixing the tap coefficients to current values when the PLL circuit operating in the second operation mode or out of synchronization, and
   the equalization means adjusts the tap coefficients when the PLL circuit operating in the first operation mode and in synchronization.

9. The video receiver according to claim 1, wherein the control means outputs a selection control signal and a hold control signal to the carrier generating means and the equalization means, respectively, when a channel changing request occurs, and the control means outputs a channel change signal to the receiving means after the carrier generating means is set to the second operation mode and the equalization means is held at a current state.

10. A set top box comprising the video receiver according to claim 1.

11. A method for reproducing a digital video signal from a modulation signal, comprising the steps of:
   a) selecting a first user-identified channel selected from a plurality of channels which are multiplexed in frequency division multiplexing;
   b) receiving the modulation signal through the first user-identified channel selected, the modulation signal conveying a digital video signal according to $2^N$ (N is an even integer) quadrature amplitude modulation ($2^N$-QAM);
   c) detecting the digital video signal from the modulation signal using a reproduced carrier signal;
   d) generating the reproduced carrier signal from the digital video signal received through the channel in a first operation mode providing the reproduced carrier signal based on $2^N$ level ranges corresponding to possible signal points on a $2^N$-QAM signal constellation, respectively;
   e) compensating for channel distortions included in the digital video signal by adjusting tap coefficients of a transversal filter to produce the digital video signal;
   f) selecting a second operation mode to generate the reproduced carrier signal and holding the tap coefficients at a current state when a channel change request occurs, the second operation mode providing the reproduced carrier signal based on selected level ranges corresponding to signal points selected from the possible signal points on the $2^N$-QAM signal constellation, respectively; and
   g) selecting a requested second user-identified channel from the channels after the second operation mode is selected and the tap coefficients are held at the current state.

12. The method according to claim 11, wherein, in the step (f), the second operation mode provides the reproduced carrier signal based on the selected level ranges corresponding to signal points existing on diagonal lines with respect to orthogonal axes of the $2^N$-QAM signal constellation.

13. The method according to claim 11, wherein the reproduced carrier signal is generated by a PLL circuit, the step (d) comprises the steps of:
   extracting a PLL control signal from the digital video signal;
   detecting the selected level ranges from the digital video signal to producing a detection signal;
   generating a phase control signal from the PLL control signal such that the phase control signal is generated based on the PLL control signal; and
   generating the reproduced carrier signal based on the phase control signal.

14. The method according to claim 11, wherein the reproduced carrier signal is generated by a PLL circuit, the step (f) comprises the steps of:
   extracting a PLL control signal from the digital video signal;
   detecting the selected level ranges from the digital video signal to producing a detection signal;
   generating a phase control signal from the PLL control signal such that the phase control signal is generated based on the PLL control signal and the detection signal; and
   generating the reproduced carrier signal based on the phase control signal.

15. The method according to claim 11, further comprising the step of detecting PLL synchronization based on the phase control signal, wherein the phase control signal is generated based on the PLL control signal and the detection signal when the PLL synchronization is not detected.

16. The method according to claim 15, wherein the phase control signal is generated based on the PLL control signal and the detection signal when the second operation mode is selected or when the PLL synchronization is not detected, and
   the phase control signal is generated based on the PLL control signal when the first operation mode is selected and the PLL synchronization is detected.

17. The method according to claim 16, wherein the tap coefficients is fixed to current values when the second operation mode is selected or when the PLL synchronization is not detected, and
   the tap coefficients are adjusted when the first operation mode is selected and the PLL synchronization is detected.

18. A video receiver comprising:
   a tuner for receiving a modulation signal through a user-identified channel selected from a plurality of channels which are multiplexed in frequency division multiplexing, one of the channels being selectable according to a channel designation signal, the modulation signal conveying a digital video signal according to $2^N$ (N is an even integer) quadrature amplitude modulation ($2^N$-QAM);
   a QAM detector for detecting the digital video signal from the modulation signal using a reproduced carrier signal;
   a carrier recovery circuit for generating the reproduced carrier signal from the digital video signal received through the channel, the carrier generating means having a first operation mode and a second operation mode wherein the first operation mode is normally selected and the second operation mode is selected by a selection control signal, the first operation mode providing the reproduced carrier signal based on $2^N$ level ranges corresponding to possible signal points on a $2^N$-QAM signal constellation, respectively, and the second operation mode providing the reproduced carrier signal based on selected level ranges corresponding to signal points selected from the possible signal points on the $2^N$-QAM signal constellation, respectively;
   a digital equalizer for compensating for channel distortions included in the digital video signal by adjusting tap coefficients of the digital equalizer to produce an equalized digital video signal, the tap coefficients being fixed to current values according to a hold control signal; and
   a controller for controlling the tuner responsive to a user channel selection input, the carrier recovery circuit and the digital equalizer such that the selection control signal and the hold control signal are output to the carrier recovery circuit and the digital equalizer, respectively, before the channel designation signal is output to the tuner.

19. The video receiver according to claim 18, wherein the second operation mode provides the reproduced carrier signal based on the selected level ranges corresponding to signal points existing on diagonal lines with respect to orthogonal axes of the $2^N$-QAM signal constellation.

* * * * *